United States Patent
Vuggrala et al.

(10) Patent No.: US 11,777,791 B2
(45) Date of Patent: Oct. 3, 2023

(54) FAILURE DETECTION AND SEAMLESS TRAFFIC SWITCHOVER USING A VPN SYSTEM

(71) Applicant: HEWLETT PACKARD ENTERPRISE DEVELOPMENT LP, Houston, TX (US)

(72) Inventors: Shravan Kumar Vuggrala, Bangalore (IN); Raghunandan Prabhakar, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 242 days.

(21) Appl. No.: 17/221,815

(22) Filed: Apr. 4, 2021

(65) Prior Publication Data

US 2022/0141084 A1    May 5, 2022

(30) Foreign Application Priority Data

Oct. 30, 2020    (IN) .............................. 202041047440

(51) Int. Cl.
*H04L 12/24*    (2006.01)
*H04L 41/0668*    (2022.01)
(Continued)

(52) U.S. Cl.
CPC ...... *H04L 41/0668* (2013.01); *H04L 12/4675* (2013.01); *H04L 43/0817* (2013.01);
(Continued)

(58) Field of Classification Search
CPC ............. H04L 41/0668; H04L 12/4675; H04L 43/0817; H04L 43/10; H04L 63/0272;
(Continued)

(56) References Cited

U.S. PATENT DOCUMENTS

| 7,266,715 B1 | 9/2007 | Bazzinotti et al. |
| 7,675,882 B2 | 3/2010 | Mighani et al. |

(Continued)

FOREIGN PATENT DOCUMENTS

| CN | 1722664 A | * | 1/2006 | ............. H04L 12/00 |
| WO | 2014/166065 A1 | | 10/2014 | |

OTHER PUBLICATIONS

NPL—Carmouche, J. H., "IPsec RAVPN Concentrator High Availability Using Virtual Interfaces for Tunnel Termination," IPSec Virtual Private Network Fundamentals, retrieved online Aug. 27, 2020 (Year: 2020).*

(Continued)

*Primary Examiner* — Lan-Huong Truong
(74) *Attorney, Agent, or Firm* — Hewlett Packard Enterprise Patent Department (57) ABSTRACT

Example implementation relates to a method of failure detection and seamless traffic switchover in a VPN system. A cluster of nodes exchange heartbeat messages to detect a failure at a first node in the cluster. When failure is detected at the first node, a master node transmits a failover message to a network end node connected to the first node. The failover message includes a list of active nodes to which traffic may be routed. The network end node updates its routing table based on the failover message and switches the traffic to a second node in the cluster of nodes.

18 Claims, 5 Drawing Sheets

(51) Int. Cl.
*H04L 43/10* (2022.01)
*H04L 12/46* (2006.01)
*H04W 24/04* (2009.01)
*H04L 9/40* (2022.01)
*H04L 43/0817* (2022.01)

(52) U.S. Cl.
CPC .......... *H04L 43/10* (2013.01); *H04L 63/0272* (2013.01); *H04W 24/04* (2013.01); *H04L 63/164* (2013.01); *H04L 63/168* (2013.01)

(58) Field of Classification Search
CPC . H04L 63/164; H04L 63/168; H04L 41/0893; H04W 24/04
See application file for complete search history.

(56) References Cited

U.S. PATENT DOCUMENTS

| | | | |
|---|---|---|---|
| 7,836,497 B2 | 11/2010 | Hossain et al. | |
| 9,225,592 B2 | 12/2015 | Bashandy | |
| 9,813,379 B1* | 11/2017 | Shevade | H04L 45/24 |
| 2005/0147028 A1* | 7/2005 | Na | H04L 45/00 370/217 |
| 2016/0188425 A1* | 6/2016 | Duggana | G06F 11/203 714/4.11 |
| 2022/0014463 A1* | 1/2022 | Dinha | H04L 45/74 |

OTHER PUBLICATIONS

Higginson, P. L. et al., "Development of Router Clusters to Provide Fast Failover in IP Networks," Digital Technical Journal, vol. 9, No. 3, Jan. 1997, https://www.hpl.hp.com/hpjournal/dtj/vol9num3/vol9num3art2.pdf.

Carmouche, J. H., "IPsec RAVPN Concentrator High Availability Using Virtual Interfaces for Tunnel Termination," IPSec Virtual Private Network Fundamentals, retrieved online Aug. 27, 2020, https://flylib.com/books/en/2.45.1.63/1/.

Fat Pipe Inc., "MPVPN Overview," retrieved online Aug. 27, 2020, https://www.fatpipeinc.com/products/mpvpn/index.php#headline6.

* cited by examiner

FAILURE DETECTION AND SEAMLESS TRAFFIC SWITCHOVER USING A VPN SYSTEM

BACKGROUND

A Virtual Private Network (VPN) allow users to establish secure, private communications channels over unsecured public networks such as the Internet. A VPN connection is formed by securing communications between two or more networks or network elements by encrypting or encapsulating transmissions between the networks or network elements.

A VPN system manages the VPN connections. The VPN connections are also referred to as VPN tunnels. Networking devices may be employed to establish and configure these VPN tunnels. The VPN system authenticates devices initiating communication, assigns VPN tunnels to requesting devices and manages traffic received at the network devices in the VPN system. Using the VPN system enables information to be exchanged securely between geographically dispersed sites without obtaining dedicated resources through the network.

BRIEF DESCRIPTION OF THE DRAWINGS

The drawings provide examples and/or implementations consistent with the description; however, the description is not limited to the examples and/or implementations provided in the drawings.

DETAILED DESCRIPTION

The following detailed description refers to the accompanying drawings. Wherever possible, the similar reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing example embodiments only and is not intended to be limiting. As used herein, the singular forms "a," "an," and "the" are intended to include the plural forms as well, unless the context clearly indicates otherwise. The term "plurality," as used herein, is defined as two, or more than two. It will also be understood that, although the terms first, second, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Through the disclosure, the terms "route table" and "routing table" have been used interchangeably.

The network deployments of a large organizations may include multiple users (or at least multiple client devices) at multiple physical or geographical sites. Access to secure resources of the organization may be through a Virtual Private Network (VPN) system. The client devices from multiple physical sites may be connected to Access Points (AP) or branch gateway (BG) which communicate with a VPN system that provides access to secure resources of the organization. The VPN system may have a cluster of nodes which provide communication connection between the AP/BG and the secure resources of the organization.

The VPN system ensures that the service to the client devices is seamless in case of failure of a link or a node in the VPN system. On detection of failure of a node or link, the AP/BG connected to the client device switches to an active node or active link and the communication continues.

Currently, the detection of failure is done by sending keep alive packets or messages from each AP/BG to the nodes in the VPN system. A failure of node or link may detected when there is no acknowledgement from the node to which the keep alive message was sent. In some cases, a pre-configured time period may be defined for receiving the acknowledgment. In addition, the keep alive messages may be sent multiple times. Any AP/BG detecting failure of node or link may report the failure to AP/BG which uses the node or link for routing traffic. When the AP/BG receives a node or link failure, the routing table of the AP/BG is updated and traffic is routed through an alternate route. In addition, the exchange of keep alive messages sent by each AP/BG to the VPN nodes results in the consumption of additional bandwidth.

The detection of node or link failure may take time based on the number of times the keep alive message is sent before detecting failure or the pre-configured time. The detection of failure using keep alive messages may take anywhere between 8 to 30 seconds depending and may cause service disruption for client devices. For example, voice calls may get affected for a short period until the switching to the alternate route take place. To prevent service disruptions and provide a seamless user experience, the detection of failure and switchover to alternate route should happen in a quick and efficient manner.

An example implementation relates to a method of failure detection and seamless traffic switchover in a VPN system. A cluster of nodes exchange heartbeat messages between each other to detect a failure at a node in the cluster. When a failure is detected at a first node in the cluster, a master node transmits a failover message to a network end node connected to the first node. The failover message includes a list of active nodes to which traffic may be routed. The network end node updates its routing table based on the failover messages and switches the traffic to a second node in the cluster of nodes.

Figure 1:
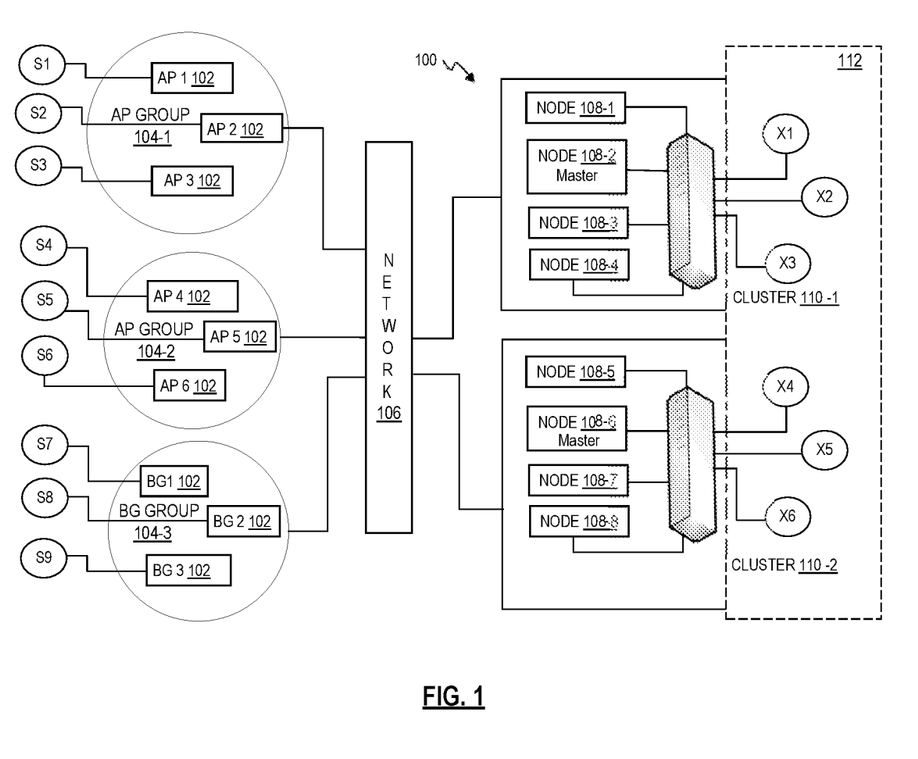
FIG. 1 illustrates an example of a network configuration in which the Virtual Private Network (VPN) system of the present disclosure may be implemented.

FIG. 1 illustrates one example of a network configuration that may be implemented for an organization, such as a business, educational institution, governmental entity, healthcare facility or other organization. FIG. 1 illustrates a wide area network (WAN) which may extend across multiple network sites (e.g. geographical, logical). Sites of the WAN are interconnected so that client devices at one site can access resources at another site. In some topologies, many services and secure resources are installed at core sites (e.g. datacenters, headquarters), and many branch sites (e.g. regional offices, retail stores) connect the client devices (e.g. laptops, smartphones, internet of things devices) to the WAN. These types of topologies are often used by enterprises in establishing their corporate network.

Client devices (not shown) in multiple locations may be connected using network end nodes 102 (AP or BG) via subnets S1-S9. Examples of client devices may include: desktop computers, laptop computers, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

In an example, the network end nodes 102 may be APs or a branch gateway. The branch gateway device may be a router, a digital-to-analog modem, a cable modem, a Digital Subscriber Line (DSL) modem, or some other network device configured to communicate to the network 106. These network end nodes 102 may be in communication with a network 106. The network end nodes 102 may be present at different remote locations. For example, the APs may be in a satellite office or on different floors in a building.

A group of these APs at a remote location may be combined to form AP groups (104-1 and 104-2). Similarly a group of branch gateways form the BG Group 104-3. The network 106 may be a public or private network, such as the Internet, or other communication network to allow connectivity among the various groups 104-1, 104-2 and 104-3 as well as access to resources of organization via subnets X1-X6.

The network end nodes 102 communicate with the secure resources 112 using VPN connections over the network 106. The VPN connections are established between the network end nodes 102 and a node within a cluster of nodes 108. FIG. 1 shows two different clusters, cluster 110-1 with nodes $108_{(1-4)}$ and cluster 110-2 with nodes $108_{(5-8)}$. Hereinafter, the nodes in any cluster are commonly referred as node(s) 108 and specific nodes in the cluster are referred by their number. Hereinafter, the clusters 110-1 and 110-2 are commonly referred as cluster 110. The cluster of nodes 108 and the secure resources 112 form the VPN system 100.

The nodes 108 in the cluster 110 may be any networking devices used for establishing and configuring the VPN connections over the network 106. In an example, the nodes 108 may be a router device or a VPN concentrator (VPNC). The flow of traffic in the WAN may be based on a routing table configured for the network end nodes (AP groups 104-1, 104-2, and 104-3) by a network manager of the WAN. In some cases, a cloud system coupled to WAN may be used for defining the route path.

In FIG. 1, 112 represents a secure resources 112 (e.g. data center) of an organization or a network which is accessible via the cluster of nodes 108 of a VPN system 100.

The network end nodes 102 provide access to internet to all the client devices and forward traffic received from client devices via subnets S1-S9 to the nodes 108. The client devices may access data present in data center of the organization via subnets X1 to X6. For example, a client device connected to AP1 may be requesting data from a server present in the data center via the subnet X1. The traffic from access points and branch gateways may reach the subnets X1 to X6 using multiple routes in the VPN system 100. For example, in FIG. 1 traffic from the AP1 may be routed via node 108-1, or node 108-2, or node 108-3, or node 108-4 in the cluster 110-1. The route is defined for each of the network end nodes in the WAN using a routing table. The routing table for each network end node 102 is pre-configured.

The routing table defines the communication path of each network end node 102 to different subnet (X1-X6) via nodes 108 in a cluster(s) 110. The cluster 110 chosen for communication and a specific node 108 via which the traffic from the network end node 102 is routed is defined based on cost. For example, to reach X1 from an AP1, the first preferred route is via the cluster 110-1 and node 108-1 with a cost factor of 10, followed by node 108-2 with cost factor of 11. The table-1 below shows the order of the preferred nodes 108 along with a cost factor associated with each node for the different network end nodes 102 (of AP group 1 (104-1) and AP group 2 (104-2)) of FIG. 1 to reach subnet X1.

TABLE 1

| AP group 1 (104-1) | X1->Node 108-1 (10) Node 108-2 (11) Node 108-3 (12) Node 108-2 (13) |
| AP group 2 (104-2) | X1->Node 108-2 (10) Node 108-3 (11) Node 108-4 (12) Node 108-1 (13) |

The client devices communicating via AP group 1 (104-1) and AP group 2 (104-2) are routed via the cluster 110-1. The client devices connected to the BG group 104-3 may be routed to X4 via cluster 110-2. The table 2 below shows the order of the preferred nodes 108 along with a cost factor associated with each node for the different network end nodes (BG devices in BG group 104-3) of FIG. 1 to reach subnet X4.

TABLE 2

| BG group 1 (104-3) | X4-> Node 108-5 (10) Node 108-6 (11) Node 108-7 (12) Node 108-8 (13) |

The cluster preference of the network end nodes 102 is shown in the table 3 below.

TABLE 3

| AP group 104-1 | Cluster 110-1 |
| AP group 104-2 | Cluster 110-1 |
| BG group 104-3 | Cluster 110-2 |

In the cluster 110-1, traffic from network end nodes 102 are routed via nodes 108-1, 108-3, 108-3 and 108-4. The node 108-2 may be a master node which communicates messages with all the network end nodes 102. Each cluster (110-1 and 110-2) of nodes 108 may have its own master node. The nodes 108 in the cluster 110 exchange heartbeat messages with other nodes 108 in the cluster. When a predetermined number of heartbeat messages from a node 108 are missing, a node failure is detected. On detecting node failure, the master node 108-2 may send a failover message with a list of active nodes in the cluster 110-1. More details related to the failure detection and switchover are explained in conjunction with FIGS. 4-6.

Figure 2:
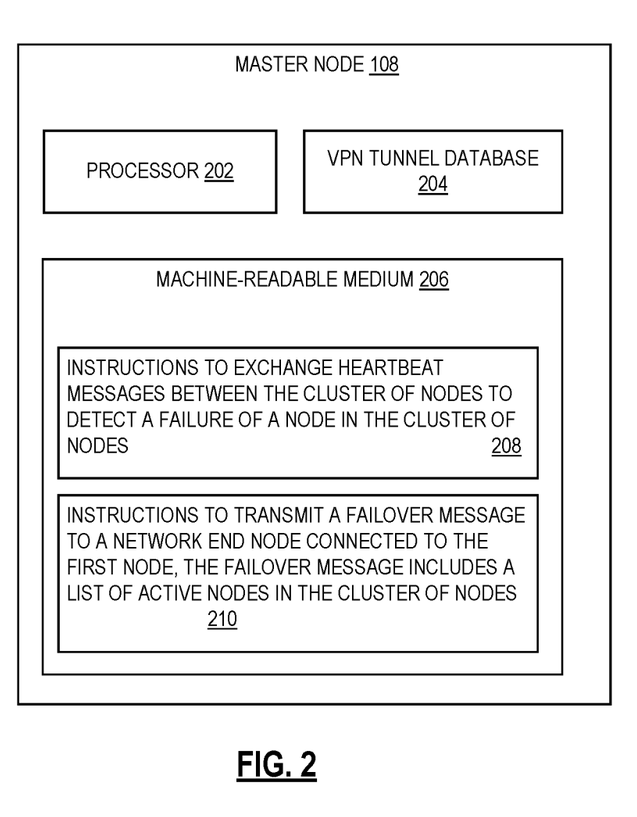
FIG. 2 illustrates component of a master node in a cluster of nodes of the VPN system, in accordance with embodiments of the present disclosure.

FIG. 2 illustrates component of a master node 108, in a cluster of nodes 108 of the VPN system 100, in accordance with embodiments of the present disclosure. As any of the nodes 108 may be considered as master node, the master node is referenced by 108.

The nodes 108 in the cluster 110-1 may be any networking device. In an example, the networking device may be a VPNC and the cluster of nodes 108 may be a cluster of VPNCs. The nodes 108 manage the VPN connection between multiple network end nodes 102 and the node 108. The nodes 108 authenticate the client devices requesting access to protected resources 112 of the organization and establish the VPN connections with the network end nodes 102. The VPN connection is established between the network end node and node 102 using a Protocol Security (IPsec) connection or a Secure Sockets Layer (SSL) connection. However, other forms of VPN connections may be employed.

As shown, in FIG. 1, one of the nodes 108-2, 108-6 in each cluster 110 may be assigned as device designed gateway for the cluster and communicates messages between the cluster of nodes 108 and the network end nodes 102. The device designed gateway may be referred to as a master node 108. Although in FIG. 1, the node 108-2 is the master node in the cluster 110-1 and the node 108-6 is the master node in the cluster 110-2, it should be noted that any node in the cluster may be the master node 108. In addition, one of the other nodes may be assigned as a standby for the master node 108.

The master node 108 includes a processor(s) 202, a VPN database 204, and a machine-readable medium 206. The processor 202 may be configured for establishing and managing VPN connections.

In a multi-link VPN system 100 deployment, the VPN connections may include multiple VPN tunnels between the network end nodes 102 and nodes 108 in the cluster 110. The information of the active VPN tunnels may be maintained in the VPN database 204.

The processor 202 may be configured to execute instructions (i.e. programming or software code) stored in the machine-readable medium 206 to perform the functions at a master node 108 as described herein. For example, the machine-readable medium 206 may include instructions 208 to exchange heartbeat message among the nodes in the cluster 110 to detect a failure of a first node 108-1 in the cluster 110-1. When a failure is detected at the first node 108-1, the instructions 210 may be executed which causes the processor 202 to transmit a failover message to the network end nodes 102 connected to the first node 108-1. Although FIG. 2 shows only two instructions, it should be understood that several instructions may be stored in the machine-readable medium 206.

The routing tables for the network end nodes 102 are pre-defined by a management device in the WAN of the organization or by a cloud system coupled to the WAN. The routing is defined based on the location of the network end nodes 102 and cost factor associated with each node 108. The failover message is sent directly to the network end nodes 102 from the master node 108. This means that the VPN system updates the route table defined for the network device without involving communication with the cloud system or management device.

Figure 3:
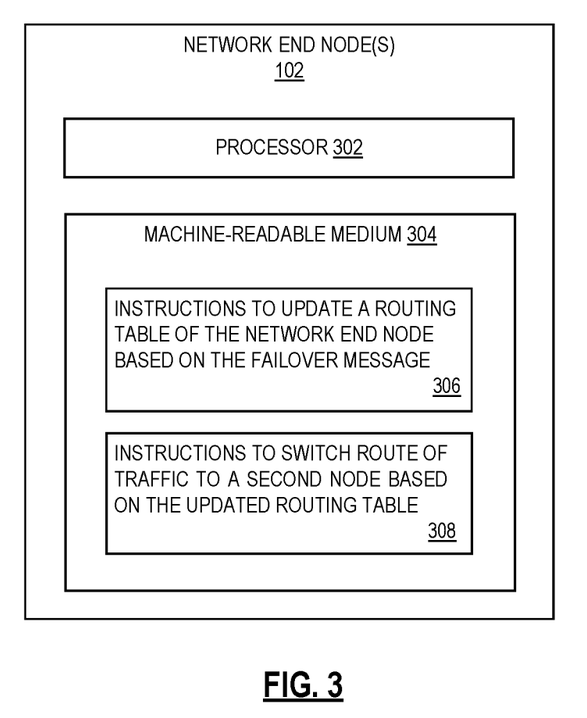
FIG. 3 is a block diagram of a network end node having a processor operably coupled to a machine readable medium storing executable program instructions, in accordance with embodiments of the present disclosure.

FIG. 3 is a block diagram of a network end node(s) 102 having a processor 302 operably coupled to a machine readable medium 304 storing executable program instructions, in accordance with embodiments of the present disclosure. In an example, the network end node 102 may be an access point as shown in AP group 104-1 and 104-2 (as shown in FIG. 1) or a branch gateway device as shown in BG group 104-3 (as shown in FIG. 1).

The network end node 102 forwards the traffic received from client devices to the nodes 102 to a node 108 of the WAN using a VPN tunnel. The network end node 102 includes a processor(s) 302 configured to execute instructions (i.e. programming or software code) stored in the machine-readable medium 304 to perform the functions at the network end node 102 as described herein. In case of a failure of a first node 108-1, the master node 108-2 of the cluster of nodes may send a failover message to the network end node 102 connected to the first node 108-1.

On receiving the failover message, the instructions 306 may be executed, which causes the processor 302 to update a routing table of the network end node 102 based on the failover message. The failover is message includes a list of active nodes in the cluster of nodes 108. The network end nodes 102 deactivates the route towards the first node 108-1 in the routing table.

When the routing table is updated the instructions 308 may be executed, which cause the processor 302 to switch the route of traffic to a second node 108-2 based on the updated routing table.

Although FIG. 3 shows only two instructions, it should be understood that several instructions may be stored in the machine-readable medium 304 of the network end node 102. In additions, the network end nodes 102 may include additional hardware device and software for communication with the client devices and nodes 108, which are not shown in the FIG. 3.

Figure 4:
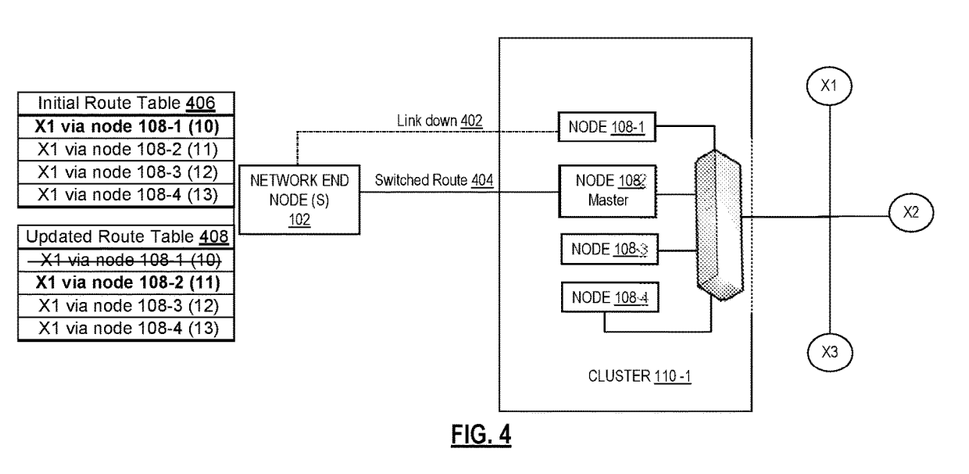
FIG. 4 illustrates operation of the VPN system, in accordance with examples of the present disclosure.

Referring now to FIG. 4, it depicts the operation of the VPN system 100 in case of a node failure. In an example, the network end node 102 may be a branch gateway or an access point forwarding traffic received from the client devices connected via subnets S1-S9.

When the node 108-2 does not receive heartbeat messages from node 108-1, the node 108-2 detects failure of node 108-1. The master node 108-2 provides a failover message to the network end node 102. The failover message includes a list of nodes alive in the cluster 110-1 to which the traffic from the network end node 102 may be routed. The network end node 102 can update its routing table based on the failover message. The network end node may de-activate the route associated with node 108-1 and switch the route of traffic to a next route 108-2 in the updated routing table.

FIG. 4 shows the initial route table 406 and the final route table 406 of the network end point 102. In the initial route table 406, the node 108-1 is the active node with which a link is established (indicated by bold text). In the updated route table 408, the node 108-1 is de-activated (indicated by strikethrough) and the next route in the route table is selected as the active node (indicated by bold text). The traffic from the network end node 102 is switched to node 108-2 as indicated in by the switched route (404).

In a multi-link scenario, where the VPN system 100 may support multiple uplinks (i.e. multiple VPN tunnels) to the same node 108, the failover message may include the state (down) of an active link. The message may indicate to the network end node 102 that the current uplink being used is down. For example, when a current uplink of the first node 108-1 is down, the route of traffic is shifted to a next uplink corresponding to a second tunnel of the first node 108-2. The current uplink is de-activated in the routing table based on the failover message.

Although FIG. 4 describes the operation of the VPN system with respect to nodes of cluster 110-1, it should be noted that the same operations can be performed in case of a failure of a node in cluster 110-2.

Figure 5:
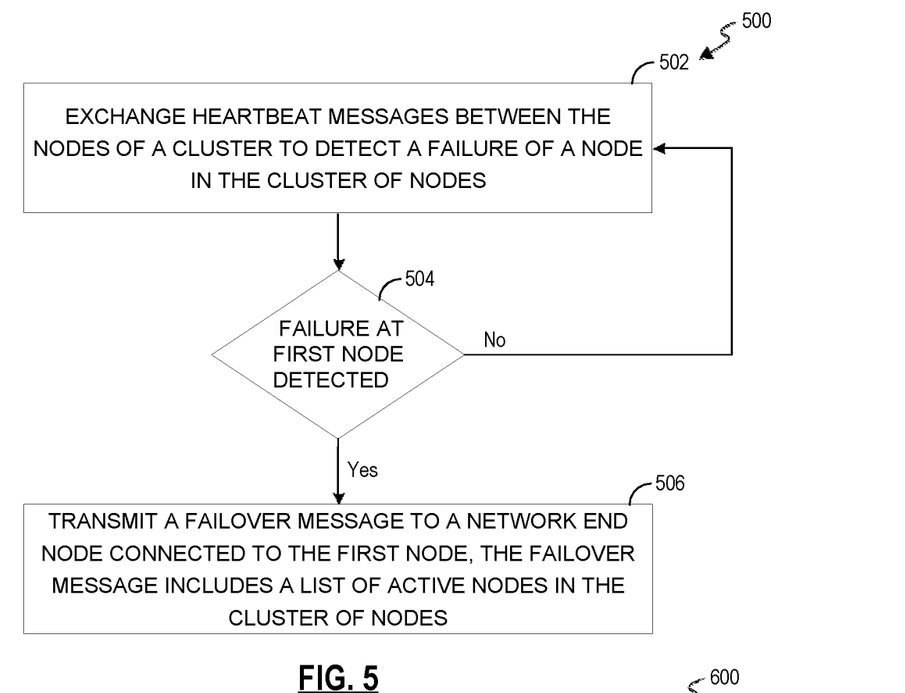
FIG. 5 is a flow diagram depicting a method of detecting failure and performing seamless failover in the VPN system, in accordance with examples of the present disclosure.

FIG. 5 is a flow diagram depicting a method 500 of detecting failure and performing seamless failover in the VPN system 100, in accordance with examples of the present disclosure. The seamless failover includes detection of the failure and switchover of the traffic from the failed node to an alternate node.

In some implementations, the method 500 may include more or fewer blocks than are shown. In some implementations, one or more of the blocks of a method 500 may, at certain times, be ongoing and/or may repeat. In some implementations, blocks of the method 500 may be combined.

The method 500 shown in FIG. 5 may be implemented in the form of executable instructions stored on a machine-readable medium 206 and executed by a processing circuitry (e.g. such as processor 202) and/or in the form of electronic circuitry in the master node 108 in the cluster of nodes 108.

The method 500 may start in block 502, with heartbeat messages being exchanged between the nodes in the cluster to detect failure at a node in the cluster of nodes 108. Each cluster 110 may include a limited number of nodes 108 leading to fewer number of heartbeat messages being exchanged to detect a failure of a node 108 or a link to the node.

At block 504, the method 500 includes determining if there is a failure of a node 108 in the cluster of nodes.

In case multi-link VPN deployments where each node 108 may have multiple uplinks, the heartbeats messages may be used to detected the failure of an uplink on a node 108.

At block 506, in response to detecting the failure of a first node 108-1, the master node 108-2 sends a failover message to a connected network end node 102. The failover message includes a list of active nodes in the cluster 110-1 of nodes 108.

In case of failure of an uplink at the first node 108-1, the failover message may be includes the state of the active link.

Figure 6:
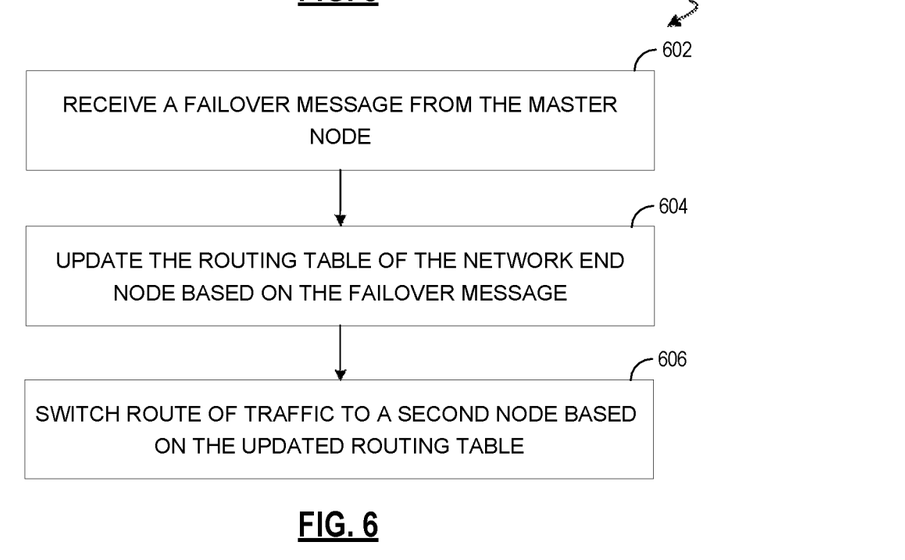
FIG. 6 is a flow diagram depicting a method for switching route at a network end node of the VPN system for a seamless switchover of traffic, in accordance with examples of the present disclosure.

FIG. 6 is a flow diagram depicting a method 600 for switching route at a network end node 102 of the VPN system 100 for a seamless traffic switchover, in accordance with examples of the present disclosure.

In some implementations, the method 600 may include more or fewer blocks than are shown. In some implementations, blocks of the method 600 may be combined.

The method 600 shown in FIG. 6 may be implemented in the form of executable instructions stored on a machine-readable medium 404 and executed by a processing circuitry (e.g. such as processor 402) and/or in the form of electronic circuitry in the network end node 102.

The method 602 may start in block 602, with the network end node 102 receiving the failover message. The failover message includes a list of active nodes 108 in the cluster of nodes 108. In cases, where the VPN system 100 supports multiple links to the same node, the failover message may include state of an active uplink. The message may indicate to the network end node 102 that the current uplink being used is down.

At block 604, the network end node 102 updates the routing table based on the failover message. FIG. 4 shows the initial route table 406 and the updated route table 408 after receiving the failover message at the network end node 108. The current route of traffic through node 108-1 is deactivated. In cases where the failover message is related to the state of current uplink, the network end node 102 may de-activate the route of the current uplink in its routing table.

At block 604, the network end node 102 switches the route of traffic to the second node 108-2 in the cluster 110 of nodes 108. In the multi-link scenario, when a current uplink of the first node 108-1 is down, the route of traffic is shifted to a next uplink corresponding to a second tunnel of the first node 108-2. The current uplink is de-activated in the routing table based on the failover message.

In comparison to current failover mechanisms using keep alive messages, the methods 500 and 600 may be performed for fast failure detection and seamless traffic switchover within a second or a sub-second. This allows time critical application such as voice calls to continue to function seamlessly in the event of a node 108 failure or an uplink failure.

The features of the present disclosure can be implemented using a variety of specific devices that contain a variety of different technologies and characteristics. As an example, features that include instructions to be executed by processing circuitry may store the instructions in a cache of the processor circuitry, in random access memory (RAM), in hard drive, in a removable drive (e.g. CD-ROM), in a field programmable gate array (FPGA), in read only memory (ROM), or in any other non-transitory, computer-readable medium, as is appropriate to the specific device and the specific example implementation. As would be clear to a person having ordinary skill in the art, the features of the present disclosure are not altered by the technology, whether known or as yet unknown, and the characteristics of specific devices the features are implemented on. Any modifications or alterations that would be required to implement the features of the present disclosure on a specific device or in a specific example would be obvious to a person having ordinary skill in the relevant art.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

In the foregoing description, numerous details are set forth to provide an understanding of the subject matter disclosed herein. However, implementation be practiced without some or all of these details. Other implementations may include modifications, combinations, and variations from the details discussed above. It is intended that the following claims cover such modifications and variations.

What is claimed is:

1. A virtual private network (VPN) system comprising:
a plurality of network end nodes connected to a cluster of nodes;
a processor associated with a master node of the cluster of nodes;
a first machine-readable medium storing instructions that, when executed by the processor of the master node, causes the processor to:
exchange heartbeat messages between the nodes in the cluster to detect a failure of a node in the cluster of nodes; and
in response to detecting the failure of a first node in the cluster of nodes, transmit a failover message to a network end node connected to the first node, wherein the failover message comprises of a list of active nodes in the cluster of nodes;
wherein the network end node comprises a network end node processor and a second machine-readable medium storing instructions that, when executed by the network end node processor, causes the network end node processor to:
  receive the failover message from the master node of the cluster of nodes;
  update a route table of the network end node based on the failover message; and
  switch route of traffic to a second node in the cluster of nodes based on the updated route table.

2. The method of claim 1, wherein the cluster of nodes forward VPN traffic received from the plurality of network end nodes to a data center.

3. The VPN system of claim 1, wherein the cluster of nodes comprises of a cluster of VPN Concentrators (VPNCs).

4. The VPN system of claim 1, wherein each of the plurality of network end nodes comprises of a wireless access point (AP) or a gateway.

5. The VPN system of claim 1, wherein the master node communicates messages from the cluster of nodes to the network end node.

6. The VPN system of claim 1, wherein connection between the first node and the network end node is one of: an Internet Protocol Security (IPsec) connection or a Secure Sockets Layer (SSL) connection.

7. A method for seamless failover in a VPN system, the method comprising:
  exchanging heartbeat messages between the nodes in a cluster of nodes to detect a failure of a node in the cluster of nodes, wherein the cluster of nodes is connected to a plurality of network end nodes;
  in response to detecting the failure of a first node in the cluster of nodes, transmitting by a master node in the cluster of nodes a failover message to a network end node connected to the first node,
  wherein the failover message comprises of a list of active nodes in the cluster of nodes;
  receiving, at the network end node, the failover message from the master node of the cluster of nodes;
  updating, a route table of the network end node based on the failover message; and
  switching route of traffic to a second node in the cluster of nodes based on the updated route table.

8. The method of claim 7, wherein detecting a failure of the first node comprises of:
  determining the failure of the first node in the cluster of nodes when a pre-defined number of heartbeat messages are not received from the first node by the other nodes in the cluster of nodes.

9. The method of claim 7, wherein the master node communicates messages from the cluster of nodes to a plurality of network end nodes.

10. The method of claim 7, wherein the cluster of nodes forward traffic received from a plurality of connected network end nodes to a data center.

11. The method of claim 7, wherein updating the route table of the network end node comprises deactivating a route towards the first node in the route tabling.

12. The method of claim 7, wherein the cluster of nodes comprises of a cluster of VPNCs.

13. The method of claim 7, wherein each of the plurality of network end nodes comprises of a wireless access point (AP) or a gateway.

14. The method of claim 7, wherein the connection between the first node and the network end node is one of: an Internet Protocol Security (IPsec) connection or a Secure Sockets Layer (SSL) connection.

15. A first non-transitory machine-readable storage medium comprising first instructions and a second non-transitory machine-readable storage medium comprising second instructions, the first instructions executable by a first processor to:
  exchange heartbeat messages between the nodes in a cluster of nodes to detect a failure of a node in the cluster of nodes; and
  in response to detecting the failure of a first node, transmit a failover message to a network end node connected to the first node, wherein the failover message comprises of a list of active nodes in the cluster of nodes; and
  the second instructions executable by a second processor to:
  receive the failover message from the master node of the cluster of nodes;
  update a route table of the network end node based on the failover message; and
  switch route of traffic to a second node in the cluster of nodes based on the updated route table.

16. The first and second non-transitory machine-readable storage mediums of claim 15, wherein the cluster of nodes comprises of a plurality of VPN Concentrators (VPNCs).

17. The first and second non-transitory machine-readable storage mediums of claim 15, wherein the network end node comprises of a wireless access point (AP) or a gateway.

18. The first and second non-transitory machine-readable storage mediums of claim 15, wherein the failover message is sent to the network end node from a master node of the cluster of nodes, and wherein the master node communicates messages from the cluster of nodes to the network end node.

* * * * *